Patented Mar. 10, 1925.

1,529,609

UNITED STATES PATENT OFFICE.

DOCK J. PEELER, OF NASHVILLE, TENNESSEE, ASSIGNOR, BY DIRECT AND MESNE ASSIGNMENTS, TO A. B. ROLLOW AND L. E. SPENCER, BOTH OF NASHVILLE, TENNESSEE.

DRESSING COMPOSITION FOR AUTOMOBILE TRANSMISSION BANDS.

No Drawing.    Application filed January 10, 1923.    Serial No. 611,852.

*To all whom it may concern:*

Be it known that I, Dock J. Peeler, a citizen of the United States, residing at Nashville, in the county of Davidson and State of Tennessee, have invented certain new and useful Improvements in a Dressing Composition for Automobile Transmission Bands, of which the following is a specification.

The invention has reference to a non-hardening and non-burning dressing for use upon the transmission bands of a certain well known make of automobile and its object is to provide such a dressing which will neither harden by time nor burn in use.

In accordance with the invention, the transmission bands are treated with suitable ingredients which protect the bands from hardening, and from burning, and which may be applied hot, up to the boiling point and so kept while running the bands through it, and which will maintain its consistency during use.

The composition consists of Polarine Fiber Grease, vegetable oil, animal fat, and bees wax. For preparing one gallon of the compound, I take ten pounds of mineral grease, one ounce of vegetable oil, one pound of animal fat, and one-half pound of bees wax, the ingredients being heated to the boiling point and so kept while running the bands through the mixture.

The Polarine Fiber Grease is known and sold by the Standard Oil Company and consists essentially of mineral jelly having mixed therewith finely ground fibrous material, the vegetable oil is pure olive oil or is commonly known as sweet oil, the animal fat used is mutton tallow and the bees wax is the common bees wax.

The several ingredients are subjected to heat corresponding to the boiling point and are kept at such heat while the bands are being run through the mixture.

The bands must be treated with the mixture before being put into the automobile and have an appropriate grip or holding value without slippage or chattering.

The mineral grease, which occurs in predominant quantity in the composition, in the form of "Polarine Fiber Grease," provides a certain amount of grip with respect to the bands, without imparting undue friction thereto.

The vegetable oil, otherwise known as olive oil or sweet oil, constitutes but a small part of the compound, and the lubricating qualities imparted by the sweet oil or olive oil are in most part negligible on account of the small proportion of the olive oil or sweet oil employed, with respect to the other ingredients.

The animal fat also represents but a small part of the volume of the compound, being represented by but one pound of tallow to eleven pounds of mineral grease and animal fat so that the lubricating qualities of the animal fat are also very small as compared with the other ingredients, while the bees wax, while representing but a relatively small part of the compound, represents a retarding element far in excess of the quantity of bees wax employed.

The transmission bands employed in automobiles are of woven fabric material and hence are absorptive of the composition with which they are treated, but the composition has no material effect upon the bands from a harmful standpoint, while the gripping qualities of the bands upon the drums they encircle is very marked and makes the bands long lasting while the composition itself does not deteriorate in use.

What is claimed is:—

A dressing composition for automobile transmission bands, consisting of the following ingredients in approximately the proportions named:—mineral jelly having a small quantity of finely ground fibrous material mixed therewith, ten pounds; mutton tallow, one pound; bees wax, one-half pound, and olive oil, one ounce.

In testimony whereof, I affix my signature hereto.

DOCK J. PEELER.